United States Patent
Phillips et al.

[11] 3,897,841
[45] Aug. 5, 1975

[54] IMPLEMENT POWER DRIVE TRAIN

[75] Inventors: Carmen S. Phillips; Patrick L. May, both of Memphis, Tenn.

[73] Assignee: International Harvester Company, Chicago, Ill.

[22] Filed: Sept. 23, 1974

[21] Appl. No.: 508,483

[52] U.S. Cl............... 180/14 R; 56/341; 74/15.69; 180/70 P
[51] Int. Cl.²........................................ B60D 7/04
[58] Field of Search.... 180/14 A, 14 B, 14 R, 53 R, 180/70 P, 71; 56/341, 342; 74/15.6, 15.69, 417; 280/420

[56] References Cited
UNITED STATES PATENTS
3,797,215  3/1974  Kopaska .................. 56/341

Primary Examiner—David Schonberg
Assistant Examiner—Terrance L. Siemens
Attorney, Agent, or Firm—Neal C. Johnson; Floyd B. Harman

[57] ABSTRACT

A hay baler adapted to be towed by a PTO-equipped tractor to pick up windrowed hay and roll the hay into a cylindrical bale of substantial size and weight. The baler includes a pickup unit, a feed roller, a bale-supporting belt, and a plurality of bale-forming belts all power driven from the PTO of the tractor. The power is transmitted through a mechanical drive train including an improved gear box unit and an improved mounting system for the unit.

11 Claims, 5 Drawing Figures

PATENTED AUG 5 1975　　　　　　　　　　　　　　　3,897,841

SHEET 1

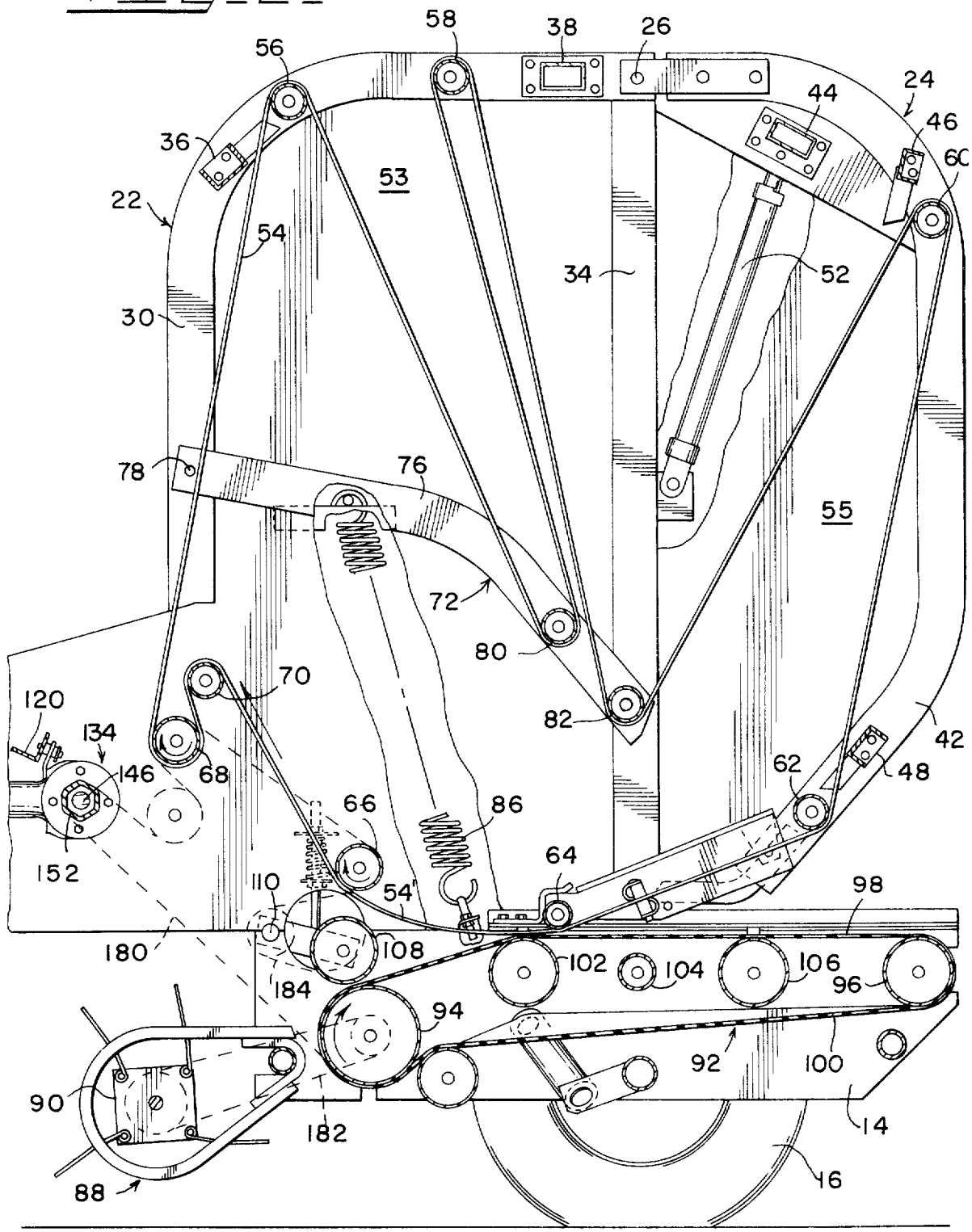

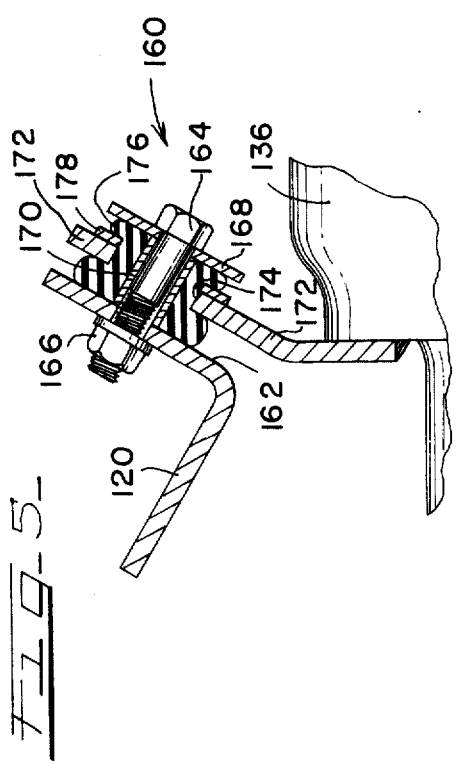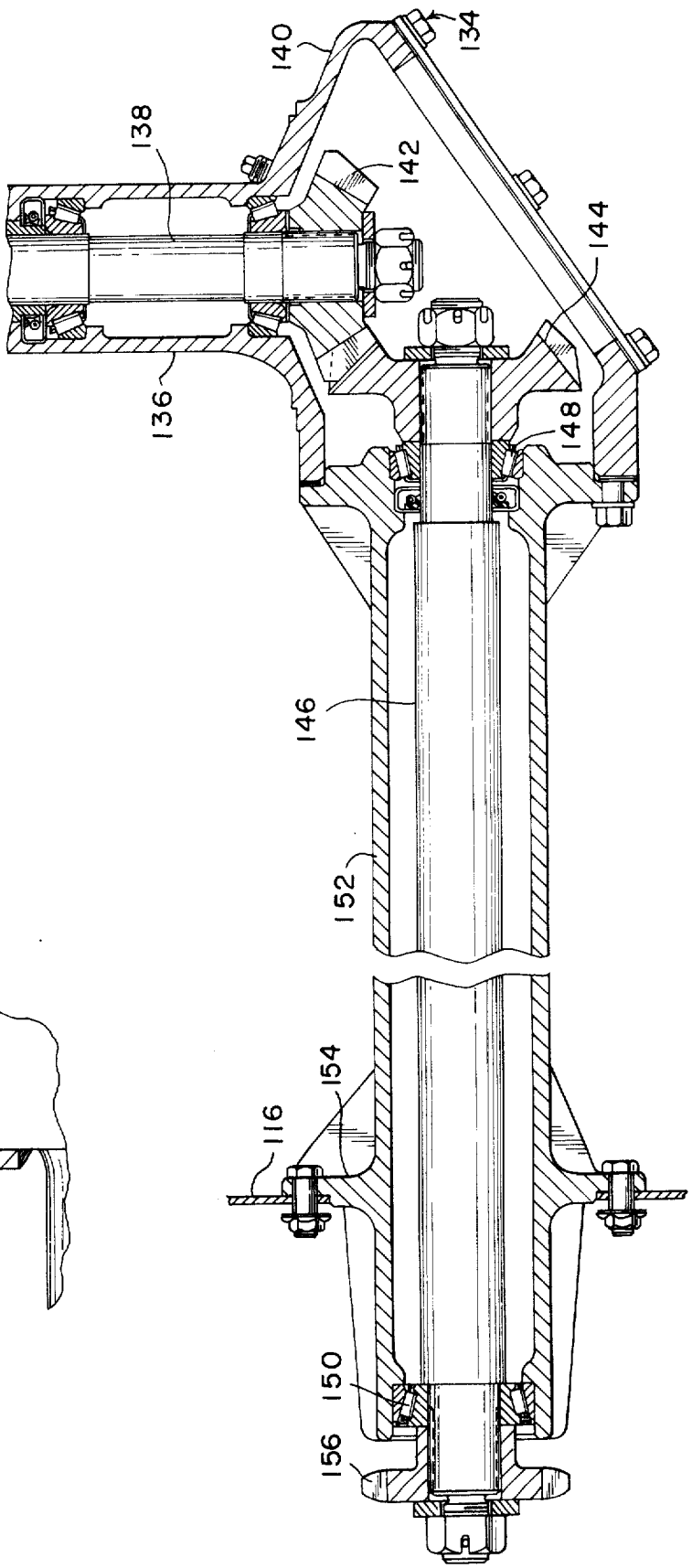

IMPLEMENT POWER DRIVE TRAIN

BACKGROUND OF THE INVENTION

1. Field of the Invention

The invention relates generally to towable implements having power-driven components and, more particularly, to an improved power train for transmitting power drive from a towing tractor to the components.

2. Prior Art

The transmission of mechanical power from a tractor to an agricultural implement frequently involves high speed of operation, large torque loads, and large driving loads from the components being driven. Another factor is that the power drive line must necessarily be articulated during turns of the tractor relative to the implement. The articulation of power drive shafting about universal joints creates speed fluctuations in the drive line. This induces high stresses and vibrations which must be accommodated.

The normal operating environment for an agricultural implement includes rough terrain which frequently induces flexure of the implement frame. When the power train components are completely rigidly secured to the frame structure, such flexure is transmitted to the components adding further stress thereon.

In conventional power drive systems utilizing gear boxes, the output shafting from the box to the power output frequently includes two generally coaxially shafts interconnected with a misalignment coupling, and the necessary bearings for the two shafts. Manufacturing and assembling these various components is costly and time consuming.

SUMMARY

The invention provides an improved and simplified power drive line system for transmitting mechanical power from a PTO-equipped tractor to the driveable components of an agricultural implement towable by the tractor. The drive line system includes an improved gear box unit and means for resiliently suspending the gear box unit from the frame structure of the implement. The gear box unit includes a unitary output shaft thus eliminating dual shafts and misalignment couplings. The output shaft is enclosed within an integral neck portion of the gear box unit. The neck is connected to a side wall of the implement frame. The output shaft is journalled within the neck by a bearing disposed proximate to the connection of the neck to the side wall such that driving loads on the output shaft are readily transferred to the implement frame. The resilient connection between the gear box unit and the frame assists in reducing the transfer of speed and vibration-induced stresses to the power drive line. In addition the resilient connections minimize the transfer of stresses onto the drive line caused by deflections of the implement frame in rough field operation.

An object of the invention is to provide an improved mechanical power drive system for an implement capable of withstanding stresses imposed by high speed operation. A further object is to provide an improved gear box unit in such a power drive system wherein the unit: is of simplified construction; is connected to the implement frame to transfer drive loads efficiently onto the frame; and, which is resiliently supported from the implement frame to reduce transfer of deflection loads and vibration between the power drive and the implement.

BRIEF DESCRIPTION OF THE DRAWINGS

FIG. 2 is an enlarged sectional view in side elevation of the baler of FIG. 1 showing the components to be driven by the power drive system;

FIG. 4 is an enlarged sectional view of an improved gear box unit in the power drive system; and FIG. 5 is an enlarged fragmentary sectional view taken in the direction of arrows 5—5 of FIG. 3.

DESCRIPTION OF THE PREFERRED EMBODIMENT

Figure 1:
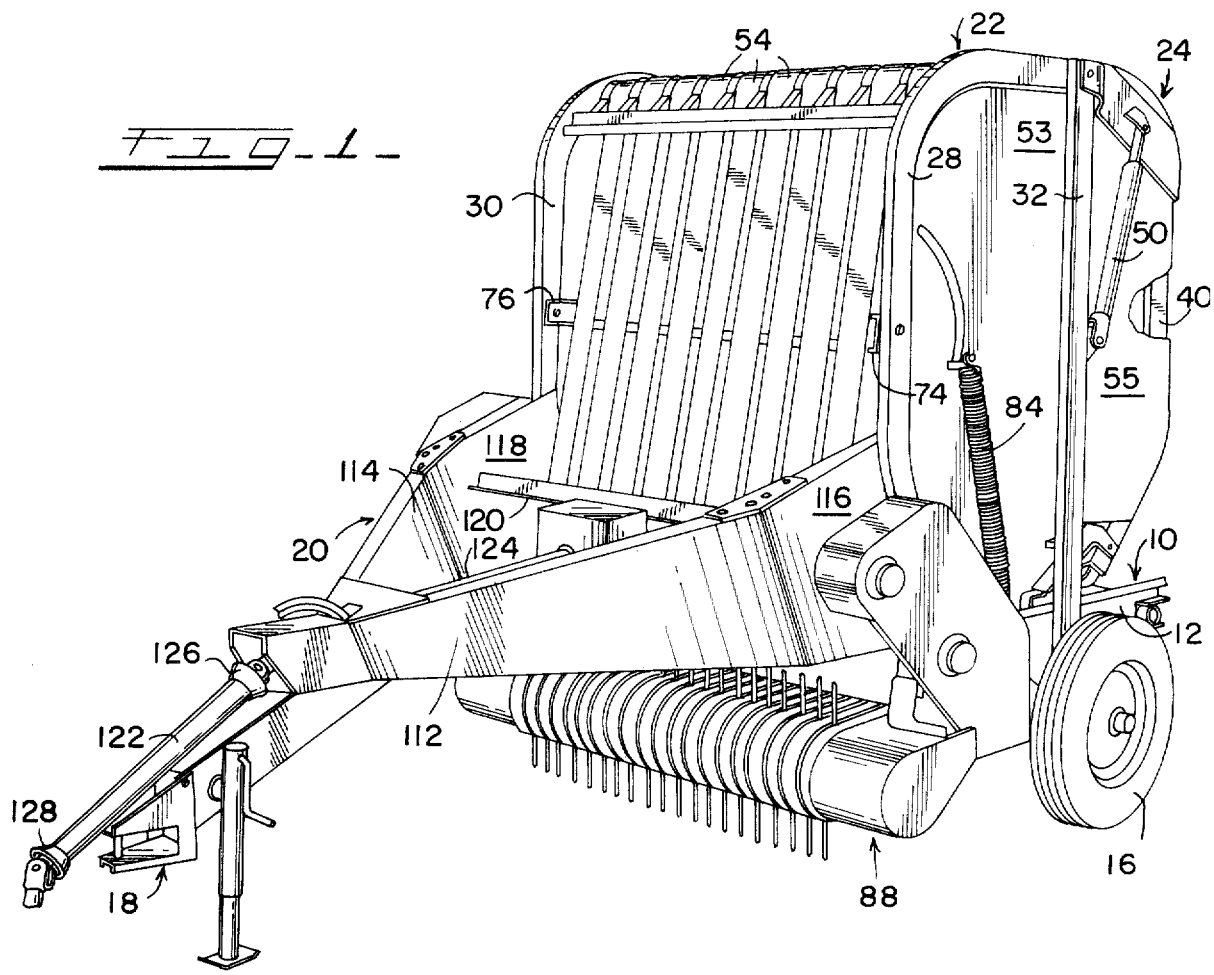
FIG. 1 is a perspective view of a hay baler incorporating the improved power drive system of the invention.

Referring first to FIGS. 1 and 2 there is shown a baler having a rigid frame 10 including a pair of transversely spaced side frame members 12 and 14 extending parallel to the center line of the frame. The frame 10 is supported on wheels 16 for towing behind a tractor (not shown) coupled to a hitch 18 on the front of a forwardly converging draft tongue structure 20 secured rigidly to the frame.

Projecting above the side frame members 12 and 14 is a superstructure comprising a fixed framework 22 and a gate structure 24 mounted on the framework 22 for pivotal movement about a pivot connection 26. The framework 22 includes a pair of generally C-shaped frame members 28 and 30 projecting upwardly from the side frame members 12 and 14 respectively. Vertical frame members 32 and 34 are secured to the side frame members 12 and 14 respectively and extend straight upwardly into rigid connection with the members 28 and 30. Suitable cross-bracing for the framework 22 is shown at 36 and 38 connected between the members 28 and 30.

The pivotal gate structure 24 includes a pair of generally C-shaped side frame members 40 and 42 interconnected rigidly by suitable cross-brace and shown at 44, 46, and 48 in FIG. 2. Hydraulic piston-cylinder units 50 and 52 are connected between the fixed framework 22 and the gate 24 on opposite sides of the baler for raising and lowering the gate about the pivot connection 26. In practice the sides of the framework 22 and gate 24 are closed by respective pairs of side sheets 53 and 55.

A plurality of endless bale-forming belts 54 are disposed in spaced parallel relatation across the width of the framework 22 and gate 24. The belts 54 are trained on support rollers 56 and 58 on the framework 22, support rollers 60, 62, and 64 on the gate 24, and drive rollers 66 and 68 and an idler roller 70 on the framework 22. The extent or reach of the belts 54 between the gate-mounted roller 64 and the framework-mounted drive roller 66 is designated 54' and constitutes an upwardly expansible upper parameter of a bale-forming zone.

The belts 54 are retained in a taut condition about a bale being formed by a bale tightener assembly 72. The assembly 72 includes a pair of rigidly interconnected arms 74 and 76 pivotally mounted on a connection 78 on the frame members 28 and 30. A pair of belt tightening rollers 80 and 82 are journalled on the arms 74 and 76 in engagement with the belts 54 as shown in FIG. 2. Elongated coil springs 84 and 86 are connected between the arms 74 and 76 and the baler frame 10 for urging the assembly downwardly about the pivot connection 78.

The baler includes a pickup unit 88 pivotally connected to the forward ends of the frame members 12 and 14. The pickup unit 88 includes a rotatable reel 90 adapted to be power driven for picking up windrowed hay from the ground and feeding it rearwardly.

Disposed rearwardly of the pickup unit 88 is an endless belt 92 trained on a forward drive roller 94 and a rearward tightener roller 96, both journalled on the frame members 12 and 14. The belt 92 extends between the rollers 94 and 96 in an upper bale-supporting run 98 and a lower return run 100. A series of support rollers 102, 104, and 106 are journalled on the frame 10 beneath the upper run 98 to support the same as a bale is formed thereon. The tightener roller 96 is biased by spring assembly (not shown) toward the rear of the baler to keep the belt 92 taut.

A power-driven press roller 108 is disposed transversely of the baler within the vertical space between the upper belt drive roller 66 and the lower belt drive roller 94 for assisting in feeding hay rearwardly from the pickup unit 88 onto the lower belt 92. The press roller 108 is spring biased downwardly about a pivot connection 110 to exert a compacting force onto the hay being fed onto the belt 92. It will be seen with reference to FIG. 2 that the above mentioned bale-forming zone is defined at the bottom by the upper run 98, at the rear by the gate-mounted roller 64, at the top by the belt reach 54', and at the front by the drive roller 66 and the press roller 108.

The foregoing constitutes a general description of the driveable bale-forming components of the baler. Since the present invention relates to the system for delivering mechanical power to the components, a general description of the operation of the baler should suffice. Windrowed hay is picked up by the pickup unit 88 and fed upwardly and rearwardly onto the belt 92 beneath the press roller 108. The upper run 98 of the belt 92 is driven rearwardly and the reach 54' of the upper belts 54 is driven forwardly. Accordingly the hay is rolled onto itself in a bale of cylindrical shape. As the diameter increases the belt tension assembly 72 pivots upwardly and the gate 24 pivots rearwardly. Upon completion of the bale the gate 24 is fully opened by the cylinder units 50 and 52 and the bale is conveyed rearwardly onto the ground by the belt 92.

The power drive system for the bale-forming components will now be described together with the frame structure upon which the drive system is mounted. As shown generally in FIGS. 1 and 3 the hitch structure 18 extends rearwardly into rigid connection with the rearwardly diverging draft tongue structure 20. The structure 20 includes diverging frame sections 112 and 114 rigidly secured to respective side walls 116 and 118 which are in turn rigidly secured to the side frame members 12 and 14 and the upright frame members 28 and 30. A cross brace 120 of right angle section is secured between the side walls 116 and 118.

The power drive train includes input shafting comprising shafts 122 and 124 interconnected by a universal joint 126, all supported on the draft tongue structure 20. The frontmost shaft 122 is connectable to the tractor PTO shaft throught a universal joint 128. The shaft 124 is connected throught another universal joint 130 to a slip clutch 132 of conventional design.

Figure 3:
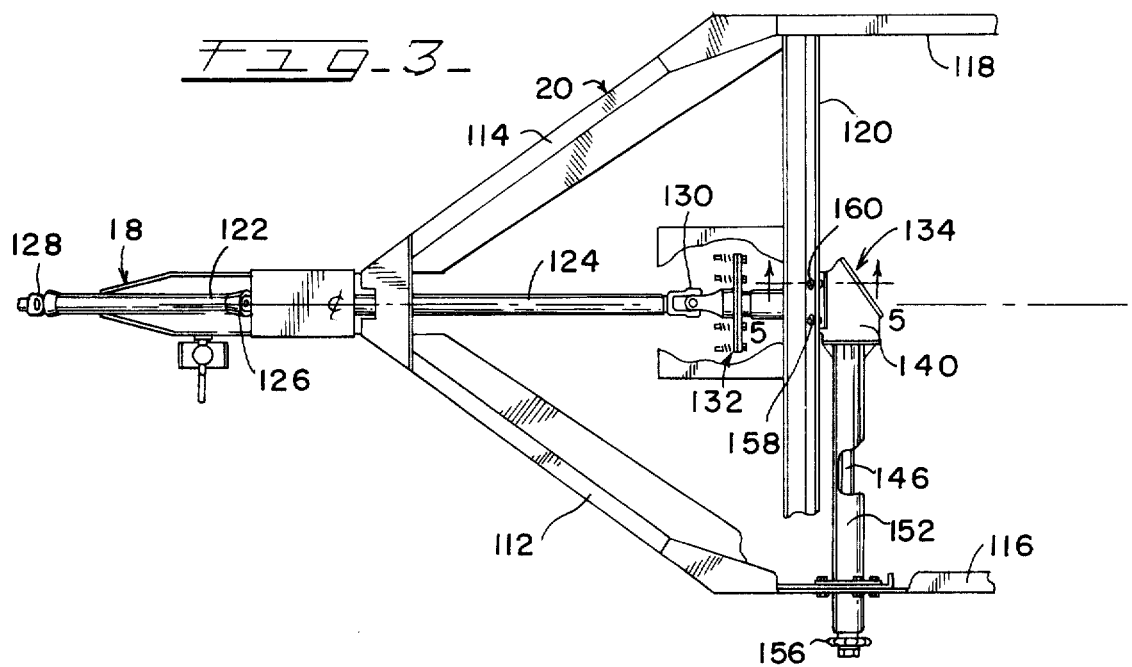
FIG. 3 is a fragmentary plan view of the implement frame and the power drive system mounted thereon.

As shown generally in FIG. 3 power is fed from the above described input shafting into a generally right angle gear box unit 134. As will be subsequently described in greater detail the gear box unit 134 is supported from the brace 120 and the side wall 116. As shown in FIG. 4 the gear box unit 134 includes a housing 136 within which is journalled an input shaft 138 coaxially with the implement center line. The housing 136 includes an enlarged portion 140 for enclosing a pair of intermeshed gears 142 and 144 secured respectively on the input shaft 138 and an output shaft 146. The output shaft 146 is journalled on bearings 148 and 150 disposed respectively near the opposite ends of an elongated neck 152 secured rigidly to the housing portion 140. The neck 152 extends from the housing portion 140 transversely of the baler through the side wall 116. As seen in FIG. 4 the neck 152 includes an integral annular flange 154 secured to the sidewall 116. The output shaft 146 extends continuously through the neck 152 and projects outwardly therefrom. An output drive sprocket 156 is secured on the outer end of the output shaft 142.

The gear box unit 134 is resiliently suspended from the brace 120 by a pair of mounting assemblies 158 and 160 spaced apart transversely and equidistantly from the implement center line (or a vertical plane disposed along the center line). The details of the assemblies 158 and 160 will be seen with reference to the sectional view through the assembly 160 in FIG. 5. The brace 120 is of right angle section and includes an inclined face 162. A bolt 164 extends through the brace 120 at right angles to the face 162 and is secured to the brace by a nut 166. A washer 168 is retained on the bolt 164 in axially spaced parallel relation to the face 162. A cylindrical spacer 170 is disposed on the bolt 164 between the face 162 and the washer 168.

A support plate 172 is secured to the housing 136 of the gear box unit 134 and extends generally upwardly therefrom. The plate 172 includes a circular opening 174 defined therethrough and in which is compressibly seated an annulus 176 of resilient elastomeric material. It will be seen that the annulus 176 is received radially about the spacer 170 and is confined axially between the face 162 and the washer 168. A washer 178 is received about the periphery of the annulus 176 adjacent to the plate 172.

Drive from the above described power drive system of the invention is transferred from the output drive sprocket 156 (FIG. 3) to the drive rollers 66 and 68 of the belts 54 and the drive roller 94 of the belt 92 through an endless drive chain shown in dotted lines at 180 in FIG. 2. The pickup unit 88 and press roller 108 are driven by respective drive chains shown in dotted lines at 182 and 184.

During operation the driving loads imposed upon the output drive sprocket 156 by the chain 180 are transferred in part through the bearing 150 and gear box neck 152 onto the side wall 116 of the baler. The resultant of the torque and driving loads operative between the gear box unit 134 and the brace 120 acts generally axially of the bolts 164 and thus axially compresses the resilient members 176. Loads such as caused by the deflection of the implement frame and vibrations are absorbed by the members 176 regardless of direction of imposition.

By the foregoing applicant has provided an improved power drive system effective in achieving the objects of the invention.

What is claimed is:

1. In an implement adapted to be towed behind a PTO-equipped tractor and having power driveable components, the improvement comprising:

a frame including a pair of forwardly extending side wall members on opposite sides of the longitudinal center line of the implement, a transversely extending brace connected between the side wall members, and a draft tongue structure extending forwardly from the side wall members;

power input shafting supported on the draft tongue structure and adapted for transmitting power from the PTO to the implement;

a gear box unit having an input shaft coupled to said input shafting and an output shaft extending at substantially a right angle therefrom and projecting through one of said side wall members, said gear box unit including gearing for transmitting drive power from said input shaft to said output shaft through said angle, said gear box unit further including a housing for said gearing and an elongated tubular neck disposed about said output shaft in rigid connection to said housing at one end and to said one side wall member at the other end;

and means resiliently suspending said housing from said brace from minimizing transfer of deflection loads between said frame and said gear box unit.

2. The subject matter of claim 1, including an output drive member on said output shaft outboard of said one side wall member for transmitting power drive to said components;

and a bearing supporting said output shaft within said neck proximate to said one side wall member whereby portions of the driving loads imposed upon said drive member are transferable through said bearing and said neck onto said one side wall member.

3. The subject matter of claim 1, wherein said means includes a pair of elastomeric members retained compressively between said gearing housing and said brace.

4. The subject matter of claim 3, wherein said elastomeric members are transversely spaced apart and equidistant from said center line.

5. The subject matter of claim 1, wherein said input shaft of said gear box unit is disposed within a vertical plane along said center line.

6. The subject matter of claim 5, wherein said means includes a pair of elastomeric members retained between said gearing housing and said brace in transversely spaced equal distance from said center line.

7. The subject matter of claim 1, wherein said means includes a support plate rigidly secured to said gearing housing and having an opening defined therethrough, a bolt secured to said brace and projecting through said opening, and a resilient elastomeric annulus disposed on said bolt and compressively seated within said opening.

8. The subject matter of claim 7, including an output drive member on said output shaft outboard of said one side wall member for transmitting power drive to said components, said output drive member being subjected to driving loads portions of which being transferred through said gear box unit compressively onto said elastomeric annulus.

9. The subject matter of claim 8, including a bearing supporting said output shaft within said neck proximate to said one side wall member whereby portions of the driving loads imposed upon said output drive member are transferable through said bearing and said neck onto said one side wall member.

10. The subject matter of claim 1, wherein said means includes a support plate rigidly secured to said gearing housing and a pair of mounting assemblies spaced transversely apart and equidistantly from said center line;

each of said assemblies including an opening defined through said support plate, a bolt secured to said brace and projecting through said opening, and a resilient elastomeric annulus disposed on said bolt and compressibly seated within said opening.

11. The subject matter of claim 10, wherein each of said mounting assemblies further includes a washer mounted on said bolt in spaced relation to said brace for confining said annulus axially therebetween.

* * * * *